United States Patent
Liu et al.

(10) Patent No.: US 10,958,154 B2
(45) Date of Patent: Mar. 23, 2021

(54) WIRELESS RECEIVER RECTIFIER LOW SIDE CURRENT LIMITED OPERATION

(71) Applicant: Integrated Device Technology, Inc., San Jose, CA (US)

(72) Inventors: Rui Liu, Fremont, CA (US); Gustavo J. Mehas, Mercer Island, WA (US); Lijie Zhao, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 193 days.

(21) Appl. No.: 16/025,779

(22) Filed: Jul. 2, 2018

(65) Prior Publication Data
US 2019/0013728 A1    Jan. 10, 2019

Related U.S. Application Data

(60) Provisional application No. 62/529,391, filed on Jul. 6, 2017.

(51) Int. Cl.
| | | |
|---|---|---|
| *H02M 7/219* | (2006.01) | |
| *H02M 1/32* | (2007.01) | |
| *H02J 50/12* | (2016.01) | |
| *H02M 1/00* | (2006.01) | |

(52) U.S. Cl.
CPC .............. *H02M 1/32* (2013.01); *H02J 50/12* (2016.02); *H02M 2001/0045* (2013.01)

(58) Field of Classification Search
CPC ... H02J 50/12; H02M 2001/0045; H02M 1/32
See application file for complete search history.

(56) References Cited

U.S. PATENT DOCUMENTS

| | | | |
|---|---|---|---|
| 2006/0176676 A1 | 8/2006 | Kuroda et al. | |
| 2008/0055796 A1* | 3/2008 | Chu | H02H 9/045 |
| | | | 361/18 |
| 2010/0054005 A1 | 3/2010 | Grosskopf et al. | |
| 2011/0080152 A1 | 4/2011 | Luzzi et al. | |
| 2013/0130621 A1 | 5/2013 | Kim et al. | |
| 2013/0235632 A1* | 9/2013 | Knoedgen | H02M 7/06 |
| | | | 363/126 |
| 2015/0222330 A1 | 8/2015 | Rapakko et al. | |

(Continued)

FOREIGN PATENT DOCUMENTS

| | | |
|---|---|---|
| CN | 100547891 C | 10/2009 |
| JP | 2017070178 A | 4/2017 |
| TW | I450485 B | 8/2014 |

OTHER PUBLICATIONS

International Search Report and Written Opinion dated Oct. 26, 2018 issued in related PCT App. No. PCT/US2018/040722 (15 pages).

(Continued)

*Primary Examiner* — Carlos Amaya
*Assistant Examiner* — Esayas G Yeshaw
(74) *Attorney, Agent, or Firm* — Haynes and Boone, LLP

(57) ABSTRACT

In accordance with aspects of the present invention, a wireless power circuit is presented. In some embodiments, the wireless power circuit includes one or more high-side transistors; one or more low-side transistors coupled in series with the one or more high-side transistors, wherein the one or more low-side transistors can be controlled as current sources.

20 Claims, 2 Drawing Sheets

(56) References Cited

U.S. PATENT DOCUMENTS

| | | | | |
|---|---|---|---|---|
| 2015/0263511 A1* | 9/2015 | Sandner | ............... | H02H 7/1252 |
| | | | | 363/53 |
| 2015/0349573 A1* | 12/2015 | Tschirhart | ............... | H02J 50/12 |
| | | | | 320/108 |
| 2016/0294227 A1* | 10/2016 | Podkamien | ............... | H02J 5/00 |
| 2016/0380488 A1* | 12/2016 | Widmer | ................. | H02J 50/10 |
| | | | | 324/207.15 |
| 2017/0194285 A1* | 7/2017 | Zhu | ......................... | H01L 24/85 |
| 2018/0160383 A1* | 6/2018 | Nakano | ............... | H04B 5/0075 |

OTHER PUBLICATIONS

Taiwan Search Report from Taiwan Patent App. No. 107123281, dated May 10, 2019, 2 pps.

\* cited by examiner

WIRELESS RECEIVER RECTIFIER LOW SIDE CURRENT LIMITED OPERATION

RELATED APPLICATIONS

This disclosure claims priority to U.S. Provisional Application Ser. No. 62/529,391, filed on Jul. 6, 2017, which is herein incorporated in its entirety.

TECHNICAL FIELD

Embodiments of the present invention are related to wireless power receivers and, specifically, to wireless power receiver current limited operation.

DISCUSSION OF RELATED ART

Mobile devices, for example smart phones, tablets, wearable devices and other devices are increasingly using wireless power charging systems. There are multiple different standards for wireless transfer of power, which utilize a variety of different transmission frequencies. Frequencies used can vary widely, for example from less than 100 KHz to over 6.78 MHz.

The more common standards for wireless transmission of power include the Alliance for Wireless Power (A4WP) standard and the Wireless Power Consortium standard, the Qi Standard. Under the A4WP standard, for example, up to 50 watts of power can be inductively transmitted to multiple charging devices in the vicinity of a coil at a power transmission frequency of around 6.78 MHz. Under the Wireless Power Consortium, the Qi specification, a resonant inductive coupling system is utilized to charge a single device at the resonance frequency of the device. In the Qi standard, the receiving device coil is placed in close proximity with the transmission coil while in the A4WP standard, the receiving device coil is placed near the transmitting coil, potentially along with other receiving coils that belong to other charging devices.

However, in a transmitter/receiver wireless power transfer system, problems can arise with overvoltage conditions that can arise in the receiver. Such overvoltage conditions can cause electrical stress to components of the receiver. Further, some over voltage protection circuits that can be implemented interfere with the bi-directional, or in-band, communications between the wireless power transmitter and the wireless power receiver, which affects the operation of the transmitter/receiver power transfer system.

Therefore, there is a need to develop better wireless receiver technologies.

SUMMARY

In accordance with aspects of the present invention, a wireless power circuit is presented. In some embodiments, the wireless power circuit includes one or more high-side transistors; one or more low-side transistors coupled in series with the one or more high-side transistors, wherein the one or more low-side transistors can be controlled as current sources. Additionally, programmable current sources may be used to control the current through the transistors used as current sources.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
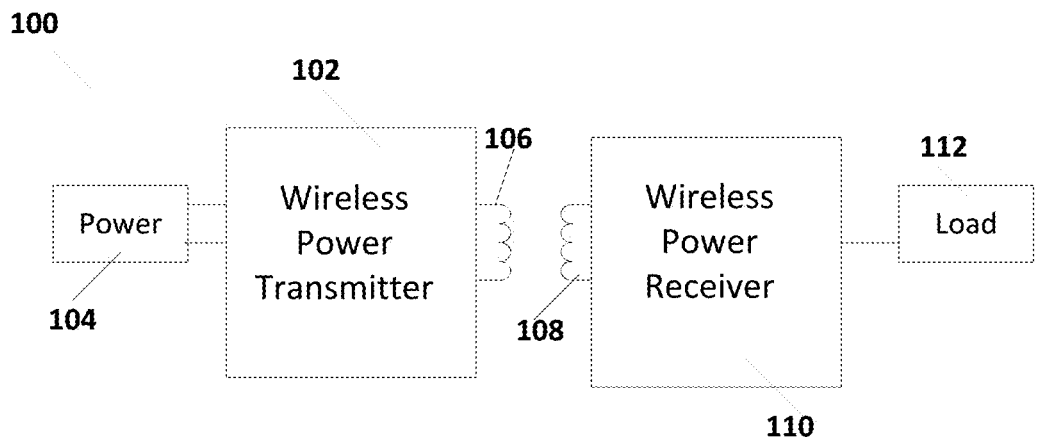
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coils 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which can represent a battery charger, and/or other components of a mobile device. Receiver 110 typically includes rectification to convert the received AC power to DC power for load 112. Load 112 can represent the other components of a mobile device, including processors, battery chargers, displays, etc.

The situation can arise during wireless power transfers where the amount of power delivered to the receiver (Rx) 110 by the transmitter (Tx) 102 can cause an Over Voltage (OV) condition on Rx 110, which in turn can cause electrical over stress (EOS) and damage to Rx 110. Furthermore, Rx 110 can include reactive modulation (e.g. reactive based Amplitude Shift Key (ASK) modulation) in order to perform in-band communication with transmitter 102. At light power transfer levels (light load) existing reactive (capacitive) based ASK modulation techniques frequently have poor signal to noise ratios (SNR) and, in some operating conditions, exhibit modulation inversion. These poor signal to noise ratios, and modulation inversions, can prevent Rx 110 from reliably communicating with Tx 102, which is providing power. The resulting loss in communications can provide difficulties for the transmitter/receiver charging system.

Previous Over Voltage Protection (OVP) utilized two methods: (1) an active clamp or (2) a mechanism for shorting the receive coil to ground. In the first method, an active clamp, sometimes with a discrete external resistors to dissipate power, is connected to the rectifier's output (VRECT). The active clamp can be used to dissipate the extra power being sent to Rx 110. Dissipation of the extra power is primarily concentrated in the integrated circuit of Rx 110 and/or in the external series resistors coupled to the integrated circuit of RX 110. Simultaneously Rx 110 communicates with Tx 102 using, for example, in-band communication to request Tx 110 to provide less power (or even terminate the power transfer in the extreme case). However, this technique can cause heating of receiver 110 as power is being dissipated and may interfere with the in-band communications.

In the second method, the rectifier of receiver 110, which includes low-side and high-side transistors, can be used to short receive coil 108 to ground. In particular, the ground referenced (Low Side) MOSFETs can be fully enhanced (turned on) simultaneously, shorting Rx coil 108 to ground. Dissipation of the extra power is now split between the integrated circuit of receiver 110 and the direct-current resistance (DCR) of receive coil 108. This method, however, prevents in band communication from RX 110 to TX 102 and requires a timeout at Tx 102, over-current protection (OCP) fault, or other fault mechanism to terminate the power transfer from TX 102 to RX 110. This method further prevents any power from being transferred to the output of the rectifier of RX 110. Also, this method can cause dangerously large currents in the Rx 110/Tx 102 system, which can result in catastrophic damage to both Rx 110 and Tx 102. The large currents frequently occur when the rectifier of RX 110 returns to normal operation.

Previous light load modulation mitigation techniques can include increasing the reactive modulation depth in RX 110 by adding additional external capacitors in parallel with the primary modulation capacitor. In other implementations an external resistor can be added in series with the modulation capacitor to create a resistive ASK modulation path, which is more effective at light loads and does not have modulation inversion issues. However, external resistive modulation is undesirable in application due the size of the resistors necessary to effectively manage the resulting power dissipation.

Figure 2:
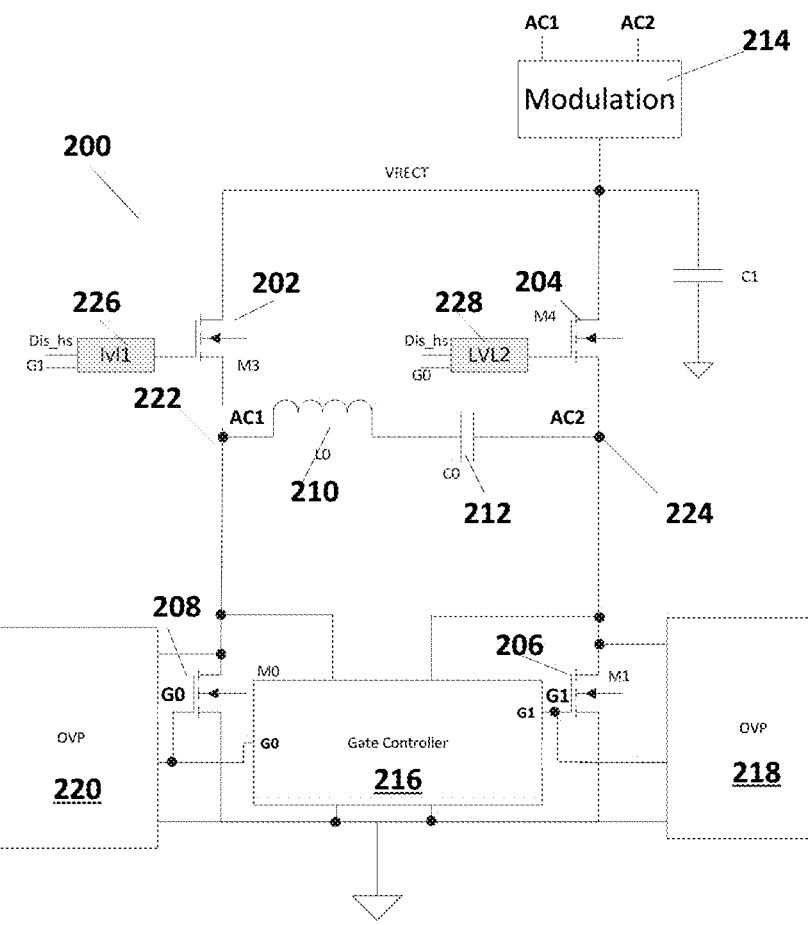
FIG. 2 illustrates a receiver according to some embodiments of the present invention.

FIG. 2 illustrates an embodiment of a section of a receiver circuit 200 according to some embodiments of the present invention. As is illustrated in FIG. 2, a receiver coil 210 and capacitor 212 are coupled in series and define voltage points AC1 222 at one end of coil 210 and AC2 224 at the end of capacitor 212 opposite coil 210.

A full rectifier bridge is formed by high-side transistors 202 and 204 and low-side transistors 208 and 206. In some embodiments, transistors 202, 204, 206, and 208 can be MOSFETs. As is illustrated in FIG. 2, high-side transistor 202 is coupled between voltage line VRECT and AC1 222. High-side transistor 204 is coupled between VRECT and AC2 224. Low-side transistor 208 is coupled between AC1 222 and ground. Low-side transistor 206 is coupled between AC2 224 and ground. The gates of high transistor 202, high-transistor 204, low transistor 208, and low transistor 206 are coupled to a gate controller 216. During normal operation, the transistors are driven such that transistor 206 is switched with transistor 202 and transistor 204 is switched with transistor 208. The consequence is that power is received by receive coil 210 and DC voltage VRECT is produced by the full-wave rectifier formed by transistors 202, 204, 206, and 208.

As is illustrated in FIG. 2, modulation 214 is coupled to VRECT and can provide ASK modulation by modulating the load coupled to VRECT. Modulation 214 can be a reactive modulator and can utilize a resistance or a capacitive type of modulation. In some embodiments, modulation 214 may be coupled to AC1 222 and/or AC2 224 to include reactive capacitors coupled with one or more of AC1 222 and AC2 224 to provide a maximum effect for in-band communications.

As is further illustrated in FIG. 2, the gate of high-side transistor 202 is driven by a circuit 226, which receives the gate voltage G1 of transistor 206 and a signal Dis_hs. Circuit 226 drives the gate of transistor 202 according to the gate voltage G1 of transistor 206 unless the signal Dis_hs is asserted, in which case transistor 202 is held in an off state. Similarly, the gate of high-side transistor 204 is driven by a circuit 228, which receives the gate voltage G0 of transistor 208 and the signal Dis_hs. Circuit 228 drives the gate of transistor 204 according to the gate voltage G0 of transistor 208 unless the signal Dis_hs is asserted, in which case transistor 204 is held in an off state.

Additionally, over-voltage protection circuit 220 is coupled between AC1 222 and ground and can detect an overvoltage condition at AC1 222. Similarly, over-voltage protection circuit 218 is coupled between AC2 224 and ground and can detect an overvoltage condition at AC2 224. In some embodiments, one or the other of OVP circuits 220 and 218 is not used.

In some embodiments, when an overvoltage protection condition is detected in OVP 220 or OVP 218, Dis_hs is asserted to shut both of transistors 202 and 204 off and transistors 208 and 206 are driven on. In that case, the low-side transistors 208 and 206 are used as current sources to divert the excess charge to ground. Transistors 202 and 204 are turned off to avoid shoot-through current from VRECT to ground.

The arrangement illustrated in the embodiment of FIG. 2 dissipates excess power inside the rectifier circuit of receiver 200 during an overvoltage event. The amount of power dissipated can be controlled by adjusting the current through transistors 206 and 208 in OVP circuits 218 and 220. Further, energy can continue to be sent to the rectifier circuit of receiver 200 while the overvoltage event is being managed. Additionally, modulation 214, which allows communications with a corresponding transmitter 102, can continue during the overvoltage event.

Additionally, with OVP 218 and OVP 220 as current sources, there are significant light-load modulation benefits. The system impact is dissipative and as a result is not subject to modulation inversion. Furthermore, the modulation depth can be adjusted precisely during the event and under normal operation to optimize power transfer efficiency versus the signal-to-noise ratio of the communications channel.

Figure 3:
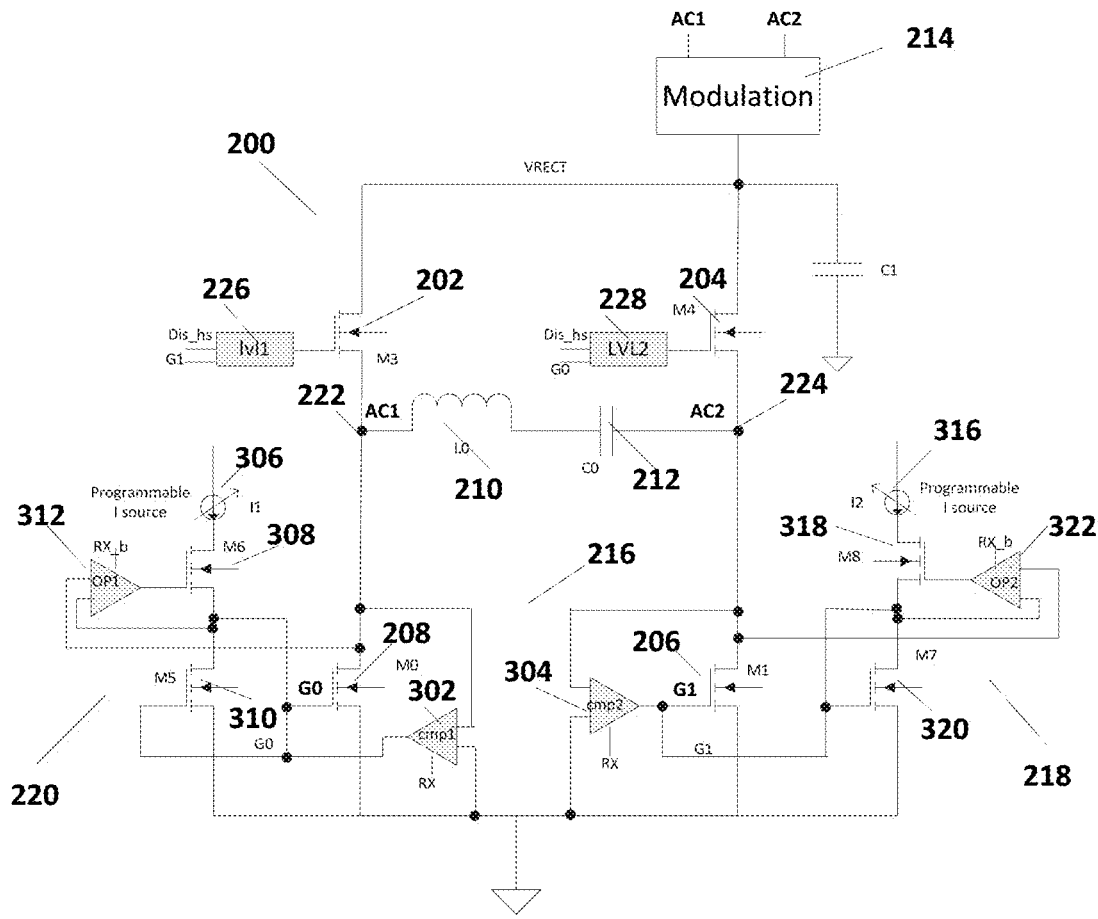
FIG. 3 illustrates a receiver according to some embodiments of the present invention.

FIG. 3 illustrates an example of receiver 200 according to the present invention. As is illustrated in FIG. 3, an example of controller 216 as discussed above can include comparator CMP1 302 coupled to compare ground with AC1 222 and provide the gate signal G0 to transistor 208, and comparator CMP2 304 coupled to compare ground with AC2 224 and provide the gate signal G1 to transistor 206.

As illustrated in FIG. 3 and discussed above, transistors 202, 204, 206, and 208, which may be MOSFETs, form the rectifier circuit of receiver 200. In normal operation transistor 202 is switched with transistor 206 according to the gate signal G1 and transistor 204 is switched with transistor 208 according to the gate signal G0. Comparators cmp1 302 and cmp2 304 are drivers for normal rectifier switching operation.

In the example illustrated in FIG. 3, over-voltage protection circuit 220 includes a programmable current source I1 306 and transistors 308 and 310 serially coupled between I1 306 and ground. An operational amplifier 312 drives the gate of transistor 308 while the gate of transistor 310 is driven by cmp1 302. Operational amplifier 312 receives input from the gate signal G0 from cmp1 302 and AC1 222.

Similarly, overvoltage protection circuit 218 includes a programmable current source I2 316 and transistors 318 and 320 serially coupled between I2 316 and ground. An operational amplifier 322 drives the gate of transistor 318 while the gate of transistor 320 is driven by cmp2 304. Operational amplifier 322 receives input from the gate signal G1 from cmp2 304 and AC2 224.

Programmable current sources I1 306 and I2 316 can be digitally programmable current sources. As such, they may be programmed wirelessly, through communications received in a demodulator from the corresponding transmitter, programmed by OVP 220 and 218, respectively, or may be controlled by other control algorithms. As is further illustrated in FIG. 3, the current control circuitry of OVP 220 is enabled by the output signal G0 from cmp1 302 while the current control circuitry of OVP 218 is enabled by the output signal G1 from comp2 304.

Op1 312 and op2 322 are operation amplifiers. When enabled, op1 312 controls transistor 308 such that the current through transistor 208 mirrors the current through transistor 308 and transistor 310. When enabled, op2 controls transistor 318 such that the current through transistor 206 mirrors the current through transistors 318 and 320.

In some embodiments, during normal rectifier operation modes, transistors 308 and 318 are off and comparators cmp1 302 and cmp2 304 drive the gates of transistors 208 and 206, respectively, in order to alternately turn on transistors 208 and 206 as discussed above. In some embodiments, transistors 308 and 318 can be used as long as programmable current sources I1 306 and I2 316 are programmed above the natural current levels of the system.

When an over-voltage event occurs, several actions can be taken. These actions include that both transistors 208 and 206 can be turned on at the same time, overriding comparitors cmp1 302 and cmp2 as necessary. The current limiting function of op1 312 and op2 322 sets the current through transistors 208 and 206, respectively, as programmed in programmable current sources 306 and 316, respectively. As transistors 208 and 206 are both on, no current is expected to flow to VRECT. During the overvoltage clamping operation, transistors 202 and 204 can be turned off to avoid shoot though current from VRECT to GND. In some embodiments, one side can be turned on at a time in a variation on normal operation.

Furthermore, there may be a modulation depth increase for larger SNR in modulation 214. Normal operation occurs, except programmable current source I1 306 or I2 316 (as appropriate) sets the current through transistor 208 or transistor 206 to be slightly below the natural system current. This causes additional power dissipation in transistor 308 or transistor 206, and therefore the desired modulation depth can be afforded and SNR increases.

In summary, a wireless power receiver is presented. The wireless power receiver includes four (4) switches where one or more of the switches can be controlled as a current source during normal operation of the receiver. These current sources can be used to increase modulation depth, to guarantee positive modulation, and to increase communication SNR. One or more of the switches can be controlled as a current source during a fault condition.

During an Over Voltage fault these current sources provide protection against electrical over stress by dissipating energy. During an Over Voltage fault these current sources provide protection against electrical over stress by preventing excessively large voltages on the rectifier output. During an Over Voltage fault these current sources allow a constant voltage to be regulated on the rectifier output. The use of these current sources during an OV event allows for ASK communication. Where the use of these currents sources prevents system damage upon the removal of the Over voltage fault. Where one or more of these current sources can be activated simultaneously in increase the effectiveness of the protection.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power circuit, comprising:
 a receive coil coupled in series with a capacitor between an AC1 node and an AC2 node;
 a rectifier circuit, the rectifier circuit including
  one or more high-side transistors coupled between an output voltage and the AC1 node or the AC2 node, and
  one or more low-side transistors coupled in series with the one or more high-side transistors between the AC1 node or the AC2 node and a ground;
 at least one overvoltage protection circuit coupled to one or more of the AC1 node and the AC2 node, each of the at least one overvoltage protection circuit includes a programmable current source coupled to series coupled transistors between the programmable current source and ground; and
 a controller coupled to the at least one overvoltage protection circuit and to the gates of the one or more high-side transistors and to the gates of the low-side transistors of the rectifier circuit, the controller configured to control the one or more high-side transistors and the one or more low-side transistors to rectify the voltage between the AC1 node and the AC2 node during normal operation, and the controller further configured to control the one or more low-side transistors such that the one or more low-side transistors can be controlled as current sources by controlling current from the programmable current source.

2. The circuit of claim 1, wherein the controller and the at least one overvoltage protection circuit is set to control the current through the one or more low-side transistors of the current sources to increase modulation depth of a communications channel.

3. The circuit of claim 2, wherein current through the one or more low-side transistors can be controlled to provide positive modulation.

4. The circuit of claim 1, wherein signal-to-noise ratio of the communications channel is increased.

5. The circuit of claim 1, wherein the current sources are controlled in response to a fault.

6. The circuit of claim 5, wherein the fault is an overvoltage fault.

7. The circuit of claim 6, wherein the current sources are controlled to provide protection against electrical over stress by dissipating energy.

8. The circuit of claim 6, wherein the current sources provide protection against electrical over stress by preventing excessively large voltages on a rectifier output.

9. The circuit of claim 6, wherein the current sources allow a constant voltage to be regulated on a rectifier output.

10. The circuit of claim 6, wherein the current sources allow for ASK communication during an over-voltage event.

11. The circuit of claim 6, wherein the current sources prevent system damage upon the removal of the Over voltage fault.

12. The circuit of claim 6, wherein the current sources can be activated simultaneously to increase the effectiveness of the protection.

13. A method of wirelessly receiving power, comprising:
    operating a rectifier with a plurality of transistors to receive power from a receive coil the plurality of transistors including high-side transistors coupled between an output voltage and the receive coil and low side transistors coupled between the receive coil and ground; and
    controlling one or more programmable current sources to control current through the low side transistors of the plurality of transistors as a current source in response to an overvoltage detection.

14. The method of claim 13, further including controlling current of the plurality of transistors to increase modulation depth of a modulator.

15. The method of claim 13, further including controlling current of the plurality of transistors to provide for positive modulation of a modulator.

16. The method of claim 13, wherein controlling one or more of the plurality of transistors includes controlling the one or more of the plurality of transistors to provide overvoltage protection.

17. A receiver circuit, comprising:
    a receive coil coupled in series with a capacitance to form a first node and a second node;
    a first transistor coupled between the first node and a power line;
    a second transistor coupled between the second node and the power line;
    a third transistor coupled between the first node and a ground;
    a fourth transistor coupled between the second node and a ground;
    a controller coupled to drive the gates of the first transistor, the second transistor, the third transistor, and the fourth transistor; and
    an overvoltage protection circuit that includes programmable current sources coupled to control currents of the third and fourth transistors,
    wherein, during regular operation, the controller circuit switches the first transistor and the fourth transistor together and switches the second transistor and the third transistor together to receive power to the power line, and
    wherein, during an overvoltage event, the overvoltage protection circuit operates to control currents of the third transistor and the fourth transistor and turn off the first transistor and the second transistor.

18. The receiver circuit of claim 17, wherein the controller includes comparators to drive the gates of the first transistor, the second transistor, the third transistor, and the fourth transistor.

19. The receiver circuit of claim 17, wherein the programmable current sources can control the current through the third transistor and the fourth transistor during normal operation.

20. The receiver of claim 19, further including a modulator, wherein the current is controlled to provide a modulation depth.

* * * * *